(12) United States Patent
Duesel, Jr. et al.

(10) Patent No.: US 7,959,376 B1
(45) Date of Patent: Jun. 14, 2011

(54) METHODS OF REDUCING GREENHOUSE GASES IN LANDFILLS AND COAL MINES

(75) Inventors: Bernard F. Duesel, Jr., Goshen, NY (US); Michael J. Rutsch, Tulsa, OK (US); Craig Clerkin, Stoughton, WI (US)

(73) Assignee: Heartland Technology Partners LLC, Kirkwood, MO (US)

( * ) Notice: Subject to any disclaimer, the term of this patent is extended or adjusted under 35 U.S.C. 154(b) by 342 days.

(21) Appl. No.: 12/043,786

(22) Filed: Mar. 6, 2008

Related U.S. Application Data

(60) Provisional application No. 60/893,345, filed on Mar. 6, 2007.

(51) Int. Cl.
*B09B 3/00* (2006.01)
(52) U.S. Cl. .................................. 405/129.95
(58) Field of Classification Search ............. 405/129.95
See application file for complete search history.

(56) References Cited

U.S. PATENT DOCUMENTS

| | | | |
|---|---|---|---|
| 5,342,482 A | 8/1994 | Duesel, Jr. | |
| 2004/0040671 A1 | 3/2004 | Duesel, Jr. et al. | |
| 2006/0240368 A1 | 10/2006 | Duesel, Jr. et al. | |
| 2006/0240369 A1 | 10/2006 | Duesel, Jr. et al. | |

OTHER PUBLICATIONS

Chicago Climate Exchange, "CCX Quarterly—Summer 2004".*
Lee, et al. "Landfill Gas Recovery: The Low-hanging Fruit for Carbon Credits Trading in Developing Countries" Sep. 2005.*
Katharine Mieszkowski Salon.com May 26, 2006 "Paying off our global warming sins".*
Chapter 9 CCX Exchange Offsets and Exchange Early Action Credits, dated 2006, printed from www.chicagoclimateexchange.com/docs/offsets/CCX_Rulebook_Chapter09_offsetsandEarlyActionCredits.pdf.
The Chicago Accord, dated 2004, printed from www.chicagoclimateexchange.com/about/pdf/ChicagoAccord_050623/pdf.
CCX Landfill Methane Gas Project Guidelines, undated, printed from www.chicagoclimateexchange.com.
CCX Market Report, vol. 5, No. 8, Aug. 2008, printed from www.chicagoclimateexchange.com.
James Kanter; In London's Financial World, Carbon Trading is the New Big Thing; Jul. 6, 2007, p. C.5; The New York Times.
Paula L. Green; Carbon Trading, What a Gas!; Global Finance; Jul./Aug. 2008, 22, 7.
Kyoto Protocol to the United Nations Framework Convention on Climate Change.

* cited by examiner

*Primary Examiner* — John Kreck
(74) *Attorney, Agent, or Firm* — Marshall, Gerstein & Borun LLP

(57) ABSTRACT

A method of reducing greenhouse gases while simultaneously generating carbon credits includes mitigating greenhouse gases at unregulated landfill sites or mitigating greenhouse gases at regulated landfill sites in excess of the required mitigation activities, obtaining carbon credits in an amount created by the mitigation efforts and selling or using the carbon credits in an open market to, for example, offset the costs of the mitigation efforts or to fund or support other greenhouse gas emission activities.

28 Claims, 5 Drawing Sheets

METHODS OF REDUCING GREENHOUSE GASES IN LANDFILLS AND COAL MINES

RELATED APPLICATIONS

This patent application is a regular filed case from, and claims the benefit of priority to U.S. Provisional Patent Application No. 60/893,345, filed on Mar. 6, 2007 and entitled "Methods of Reducing Greenhouse Gases and Generating Carbon Credits," the entire disclosure of which is hereby expressly incorporated by reference herein.

FIELD OF THE DISCLOSURE

This disclosure relates generally to a method of reducing the emissions of greenhouse gases in landfills and coal mines, and more specifically to a method of generating carbon credits while reducing greenhouse gases at various sites, such as landfills and coal mines.

BACKGROUND

Generally speaking, "global warming" refers to the observed increase in the average temperature of the Earth's atmosphere and oceans in recent decades and the projected continuation of this increase in tempratures. Models referenced by the Intergovernmental Panel on Climate Change (IPCC) predict that global temperatures are likely to increase by 1.1° to 6.4° C. (2.0° to 11.5° F.) between 1990 and 2100. The uncertainty in this range results from two factors, namely, differing future greenhouse gas (GHG) emission scenarios, and uncertainties regarding climate sensitivity.

Global average near-surface atmospheric temperature rose 0.74±0.18 degrees Celsius (1.3±0.32 degrees Fahrenheit) in the last century. The prevailing scientific opinion on climate change is that most of the observed increase in globally averaged temperatures since the mid-20th century is very likely to be due to the observed increase in anthropogenic greenhouse gas concentrations, leading to a warming of the Earth's surface and lower atmosphere by increasing the greenhouse effect. Greenhouse gases are released by activities such as the burning of fossil fuels, land clearing, agriculture, and the natural decay of trash in landfills.

Greenhouse gases are components of the atmosphere that contribute to the greenhouse effect. Some greenhouse gases occur naturally in the atmosphere, while others result from human activities. Naturally occurring greenhouse gases include water vapor, carbon dioxide, methane, nitrous oxide, and ozone. Certain human activities, however, add to the levels of most of these naturally occurring gases. For example, decomposition of trash placed into a landfill is an anaerobic process that produces methane gas which, in turn, leaves the landfill as landfill gas. The amount of methane gas created from decomposition depends on a number of factors, but is generally proportional to the composition and amount of trash placed within the landfill. Thus, each ton of trash at a given composition that is placed into a landfill creates a predictable amount of methane gas. However, owners of landfills will often not take action to mitigate the greenhouse gases (such as methane gas) produced in a landfill because the costs of such mitigation are too high, and in many cases such mitigation actions are not required by the governmental regulating bodies which regulate landfill operations.

However, there is currently a global focus on reducing GHG emissions. In fact, both international and national initiatives are currently in force and others are pending or under consideration. One example of a global effort to mitigate the effects of greenhouse gases on the global climate is the Kyoto Protocol to the United Nations Framework Convention on Climate Change, which is an amendment to the international treaty on climate change, assigning mandatory targets (GHG targets) for the reduction of greenhouse gas emissions to signatory nations. The Kyoto Protocol includes flexible mechanisms which allow some economies to meet their GHG targets by purchasing GHG emission reductions (often called "carbon credits") from elsewhere. These carbon credits can be bought or otherwise obtained either via financial exchanges (such as the new EU Emissions Trading Scheme) or from projects which reduce emissions in other economies.

Although several countries (most notably the United States) have not yet and may never ratify the Kyoto Protocol, there are also private initiatives in, for example, the United States where units of the government and private companies can voluntarily agree to reduce their GHG emissions. While joining the program is voluntary, members of this program have legally enforceable requirements for GHG reductions. Currently, this initiative is administered by the Chicago Climate Exchange (CCX). The CCX also hosts a trading exchange which facilitates the sale of carbon credits by members who do not release the amount of allowed GHG, and which facilitates the purchase of emission reductions (carbon credits) by members who are not able to achieve their required GHG reductions through their own operations. GHG reduction projects anywhere in the world are eligible for trading carbon credits on the CCX.

BRIEF DESCRIPTION OF THE DRAWINGS

Objects, features, and advantages of the present invention will become apparent upon reading the following description in conjunction with the drawing figures, in which.

DETAILED DESCRIPTION

A method of reducing greenhouse gas emissions by creating and accounting for greenhouse gas emission reduction credits is described herein. Although greenhouse gas emission reduction credits are referred to hereinafter as "carbon credits," greenhouse gas emission reductions do not have to be related to the reduction of "carbon" emissions per se, but can be related to the reduction of other greenhouse gas emissions. The method includes performing an initial site evaluation which may include, in part, measuring the amount of greenhouse gases emitted from the site and an analysis of mitigation measures already employed at the site, including mitigation of other undesirable by-products, such as landfill leachate or other wastewater. Often these other mitigation measures, such as treating landfill leachate, consume fossil fuels as an energy source to treat the undesirable by products. After the initial site evaluation, the carbon credit potential of the site may be calculated by determining how much methane or other greenhouse gas (GHG) can be converted or used to power mitigation processes already in place, if any. Once the carbon credit potential is calculated, an application may be submitted to the Chicago Climate Exchange (CCX) (or other carbon credit market entity) describing the proposed process and potential reduction of GHG emissions from the site.

At some point, such as when the CCX (or other carbon market entity) approves the application, an economic analysis of the project is conducted in which the carbon credits are accounted for in the overall budgeting process. Often, these carbon credits may turn an unprofitable site into a profitable site while improving the environment by at least partially offsetting the costs of installing GHG emission reduction equipment. Once it is determined that GHG emission reduction at a site is economically feasible (including accounting for the carbon credits), appropriate equipment is installed at a site and is operated to reduce the overall emission of greenhouse gases according to the application, thereby generating carbon credits, which may then be issued and traded (or sold) on an exchange such as the CCX.

Figure 1:
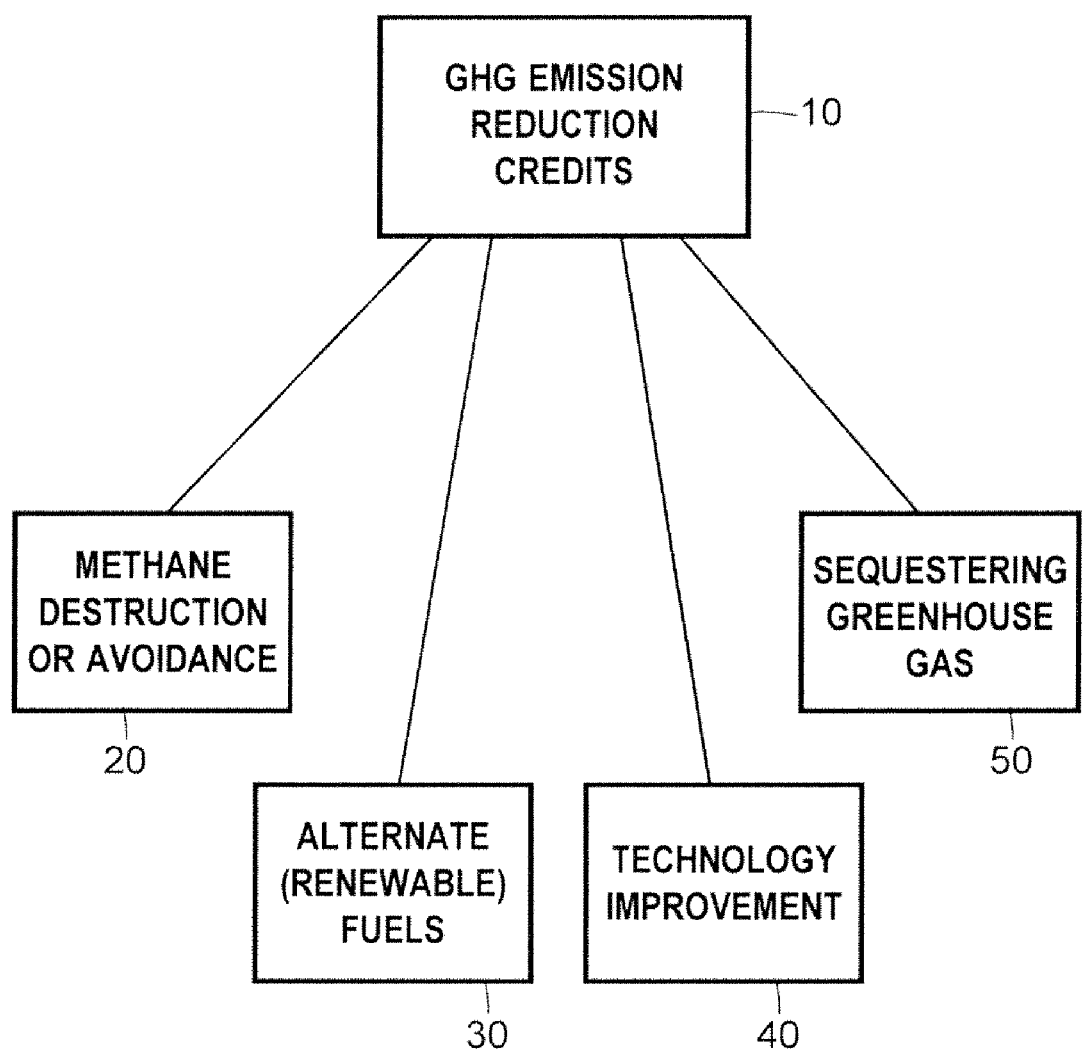
FIG. 1. is a schematic representation of methods of generating greenhouse gas (GHG) emission reduction credits.

Turning now to FIG. 1, at least four methods of generating carbon credits 10 are available under the Kyoto Protocol or the CCX. A first method 20, which is probably the most effective way to reduce GHG emissions and thereby produce carbon credits, is to destroy methane or avoid methane generation. Methane is generally destroyed by burning the methane. Carbon credits for methane destruction or avoidance are generally available for any site (e.g., landfill) where there is no current regulatory requirement to destroy methane or avoid methane generation. Carbon credits are also available for regulated sites that implement methane destruction or avoidance procedures which exceed regulatory requirements. Methane generation is generally avoided by reducing the amount of trash available for decomposition in a landfill.

A second method 30 of generating carbon credits is to use renewable fuel sources instead of fossil fuels for some process. In particular, carbon credits are available when a process that consumes fossil fuel is switched to consume a renewable fuel, such as landfill gas. One likely technology available to use landfill gas as a fuel source includes the implementation of submerged gas evaporators/processors (SGE/SGP) as shown in U.S. Pat. No. 5,342,482 and U.S. Patent Publication No. 2004/0040671, both of which are hereby incorporated by reference. Commercial examples of such SGEs are Liquid Solutions' E-VAP™ and RE-VAP™ technology. Other technologies which may be available to use landfill gas or other renewable fuel sources include power generation systems and/or waste heat recovery systems used in, for example, industrial/commercial facilities. Those in the carbon reduction industry refer to these carbon credits as "fuel switch" credits.

A third method 40 of generating carbon credits is to improve current technology to reduce the GHG outputs of such technology, such as developing cleaner burning power plants (i.e., those which reduce GHG emissions) and more efficient automobile engines. Carbon credits are also available to those who reduce emission when technology improvements decrease the amount of energy used to perform the same function (i.e., when implementing a more efficient process). Carbon credits generated by such activities and issued by a carbon credit trading authority (e.g., CCX) may be used to at least partially offset the research and development costs of improving the current technology and the cost of implementing the technology.

A fourth method 50 of generating carbon credits is to sequester greenhouse gas emissions before they are released to atmosphere. The sequestering of greenhouse gas emissions may be accomplished by using submerged gas reactors that process carbon dioxide in an exhaust gas by reacting the carbon dioxide with an alkali to form a carbonate salt thereby removing carbon dioxide from the exhaust gas and sequestering the carbon dioxide in a different molecular form (e.g., sodium carbonate) for re-use or disposal. An example of a commercially available submerged gas reactor is Liquid Solutions' RE-VAP system.

Figure 2:
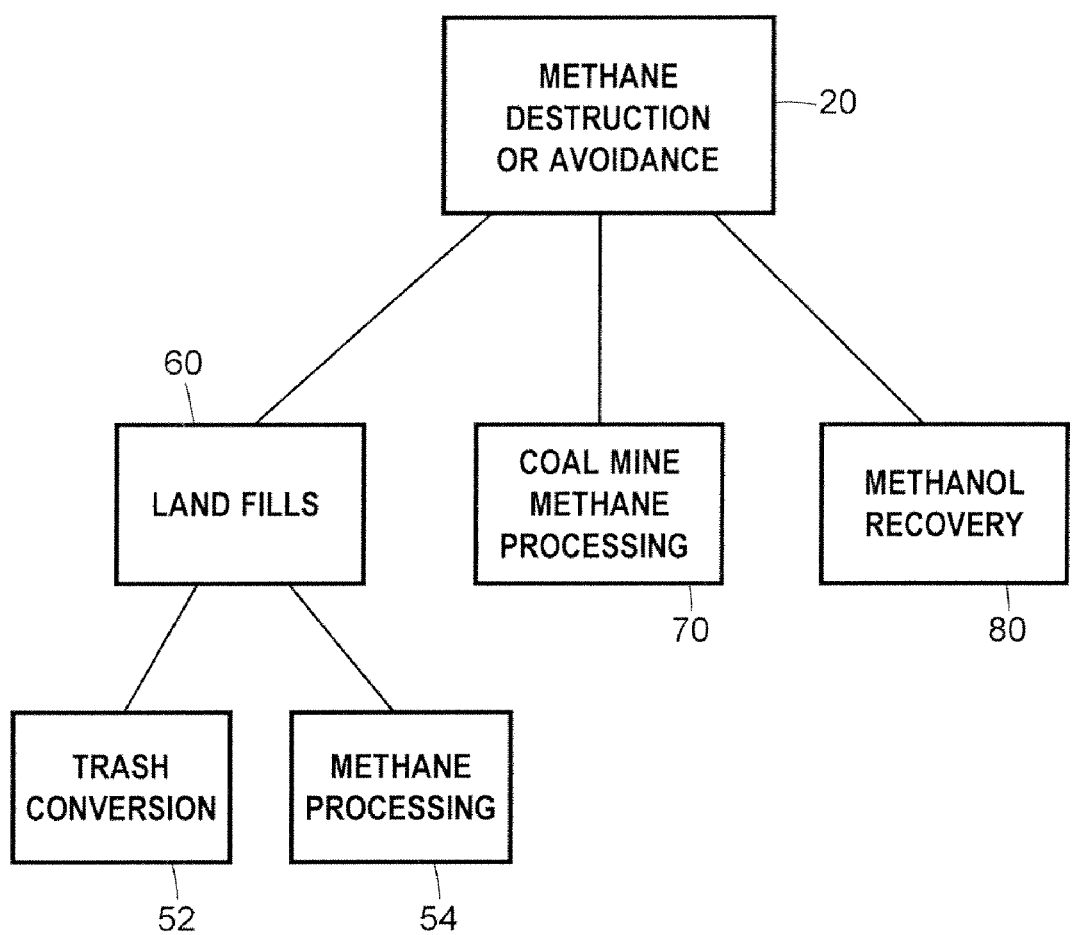
FIG. 2 is a schematic representation of different ways of reducing methane emissions to generate GHG emission reduction credits.

FIG. 2 illustrates a number of different processes or areas where methane destruction or avoidance 20 is effective in reducing GHG emissions and thereby generating carbon credits. There are at least two methods of reducing methane generated by landfills, which are significant generators of methane. In particular, methane production can be reduced by (1) reducing the amount of trash put into a landfill, thereby reducing the amount of methane produced in the landfill, and (2) processing the methane to produce a less potent greenhouse gas.

In the first case, when trash is placed into a landfill 60, the decomposition process, which is an anaerobic process, produces methane gas that leaves the landfill 60 as landfill gas. The amount of methane gas created from the decomposition process depends on a number of factors, but is generally proportional to amount of trash placed into the landfill. Thus, each ton of trash deposited into a landfill produces a predictable amount of methane gas. Conversely, each ton of trash that would have otherwise been placed into a landfill, but is instead used for some other purpose, reduces the amount of methane gas generated by an amount generally proportional to the amount of trash not placed into the landfill 60 as is illustrated by the block 52 of FIG. 2. There are some technologies that can be used to reduce the amount of trash that needs to be placed into a landfill 60, including converting the trash to fuel, composting the trash, and/or recycling the trash. Thus, reducing the amount of trash put into a landfill 60 is a way of generating carbon credits through methane avoidance.

In one example of diverting biodegradable wastes from landfills, the biodegradable waste may be converted into refuse derived fuel (RDF). RDF diverts biodegradable material from landfills thereby avoiding methane production within the landfill while providing a renewable fuel that is easy to transport and may be used as a substitute for fossil fuels. Trash can be converted to fuel by preparing the trash in a shredder/compactor and compressing the trash to produce compact RDF that may be used as an energy source in place of fossil fuel. For example, the shredder/compactor may produce RDF in a variety of forms, pellets, briquettes, fuel rods, etc.

In another example of diverting biodegradable wastes from landfills, digesters may be used to treat solid and liquid organic wastes such as manure, liquid and food wastes (e.g., animal and vegetable fats), etc. produced in agricultural operations to reduce the natural uncontrolled release of methane to atmosphere wherever the solid and liquid organic wastes decompose under anaerobic conditions such as within soil or piles. Methane produced in the controlled anaerobic environment within digesters is captured and may be applied to a wide range of processes. Wherever applied, if the use of energy from the methane generated in a digester displaces the use of fossil fuels, carbon credits may be generated.

Another way to reduce the methane gas emitted from landfills is to process the methane gas 54 to convert the methane gas into a less potent GHG. For example, simply burning the methane in a flare reduces the greenhouse effect because the products of the combustion $CO_2$ and $H_2O$ have a less significant greenhouse effect than the methane gas itself. Methane gas is a substantially more potent GHG emission than $CO_2$ or $H_2O$ and converting methane gas to other products, such as $CO_2$ and $H_2O$ reduces the greenhouse effect.

Similarly, it is possible to reduce GHG emissions by processing methane gas produced in abandoned coal mines 70. In particular, methane gas, which is found in many coal seams, is released to the atmosphere when the coal seam is disturbed, both during mining operations and after mining operations have ceased. In some cases, the methane gas can be economically recovered. In other cases, destruction of the methane may be required by regulation. However, there are many locations where destruction of the methane gas is not required nor currently financially viable.

Another method of reducing GHG emissions is to implement a product recovery process 80, such as the recovery of methanol. Methanol, which is an industrial chemical used in many applications, is commonly manufactured from natural gas. Often, methanol is used for cleaning or other processes where the methanol is not consumed. In many cases, the spent methanol is disposed of in, for example an incinerator or other waste treatment process. However, it is possible in many cases to collect and recover spent methanol and then to convert the spent methanol back to a commercial grade methanol. Because the most commonly used process for manufacturing methanol consumes large quantities of natural gas, each gallon of recovered or converted methanol reduces the amount of natural gas consumed. Further, if spent methanol is recovered in a process that includes a distillation stage employing waste heat or heat energy produced from a renewable energy source such as the methane found in landfill gas, additional reductions in the use of natural gas and/or other fossil fuels may be realized. The substitution of energy derived from waste heat or a renewable fuel source is an avoidance of the additional greenhouse gas emissions (carbon credit) that would have resulted from the direct use of fossil fuel in the distillation process.

Current U.S. regulations force landfills over a certain size to collect and treat gases generated by the landfill. However, this type of regulation leaves a large number of smaller landfills unregulated as to collection and treatment of landfill gas. Often, owners of non-regulated sites, such as non-regulated landfills, take minimal or no action to mitigate greenhouse gas emissions because the costs of mitigation yield minimal or negative return on investment. Moreover, in the case of many regulated landfills, only the minimum required landfill gas control treatment, such as burning the landfill gas in a flare is implemented.

As will be understood, using various techniques with various underlying technologies, non-economically viable sites such as landfills, coal mines, etc., may be modified to reduce the emissions of greenhouse gases in an economically viable manner based on the incorporation, creation, accounting for and selling of carbon credits. In other words, the value of the carbon credits at least partially offsets the costs of installing and maintaining greenhouse gas emission reducing equipment. Often, the carbon credits alone have enough value to make collection and disposal of greenhouse gases at landfills and other sites profitable. Furthermore, even regulated sites can benefit from these techniques as collection and conversion of greenhouse gases above and beyond the regulated requirements may be accomplished to generate carbon credits.

Figure 5:
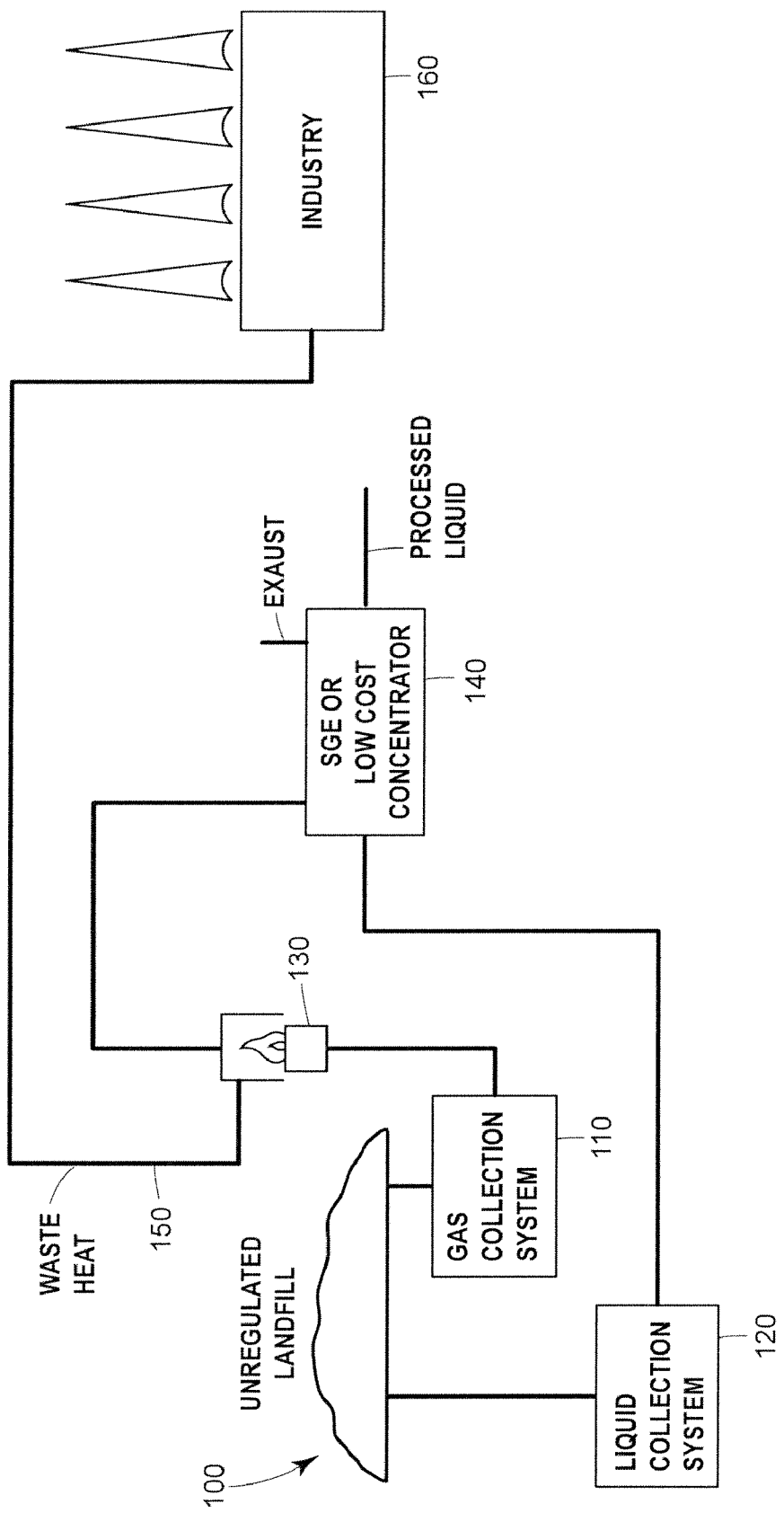
FIG. 5 is an illustration of a method of reducing GHG emissions and generating carbon credits at an unregulated landfill.

One method of reducing greenhouse gases and thereby generating carbon credits is to beneficially utilize landfill gas to process landfill leachate in, for example, a submerged combustion gas evaporator (SGB), such as that illustrated in U.S. Pat. No. 5,342,482 and U.S. Patent Publication No. 2004/0040671 (FIG. 5). Because combustion gas evaporators evaporate liquids by injecting hot combustion gas into a liquid, switching the combustion gas in such an evaporator from a fossil fuel to a renewable gas (e.g., substituting methane generated in landfills or digesters for natural gas) reduces greenhouse gas emissions and thereby provides a basis for generating carbon credits. These carbon credits currently trade for $0.5 to $2 per ton on the CCX, although the value of the carbon credits will fluctuate in accordance with supply and demand on the exchange. A typical submerged combustion gas evaporator treating 10,000 gallons per day of leachate that employs a landfill gas flare to treat exhaust vapor reduces greenhouse gas emissions by about 170 metric tonnes per day of carbon dioxide equivalent ($CO_{2c}$), thereby creating a number of carbon credits and thus providing a significant economic incentive in producing the credits. Often, the creation, accounting for, and selling of carbon credits are enough to turn a non-profitable landfill gas to energy project into a profitable one.

Figure 3:
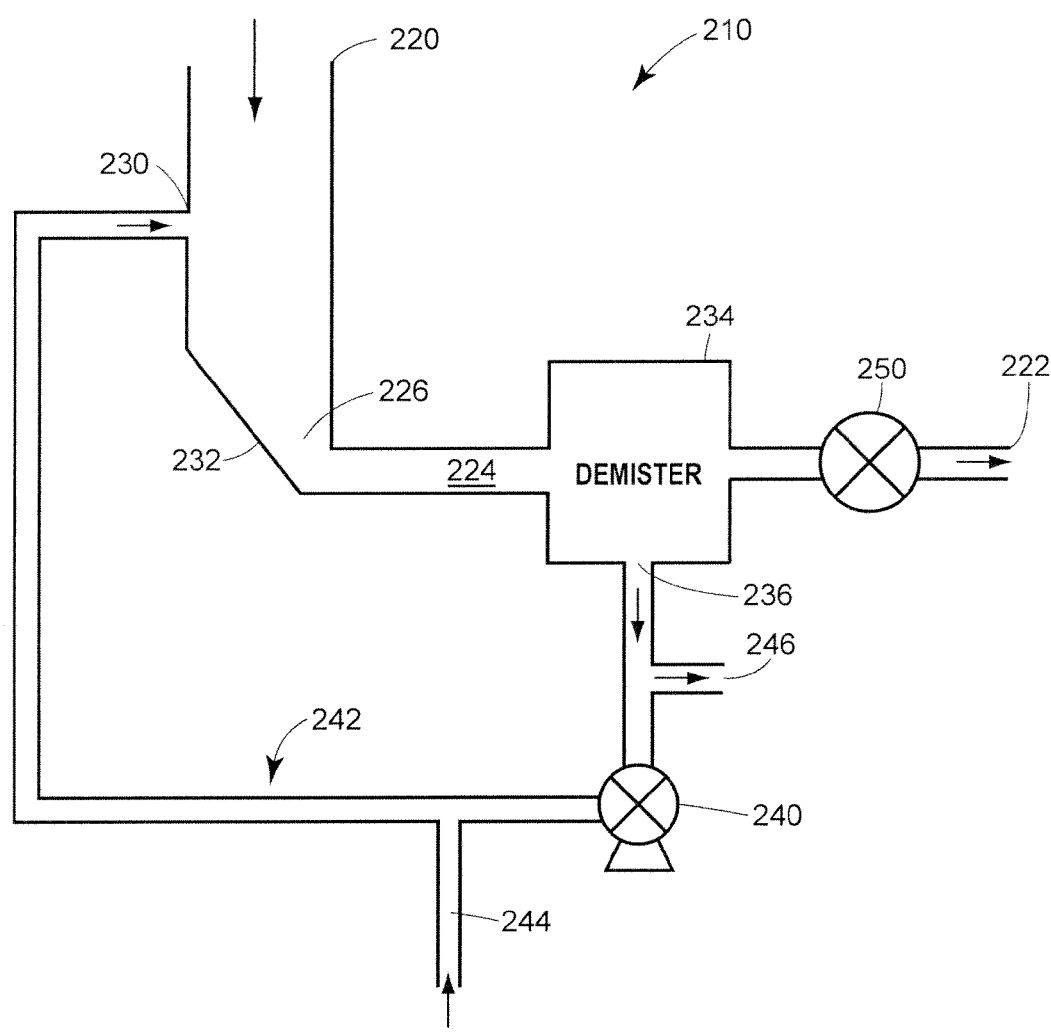
FIG. 3 is a schematic representation of a low cost concentrator used to process wastewater.
Figure 4:
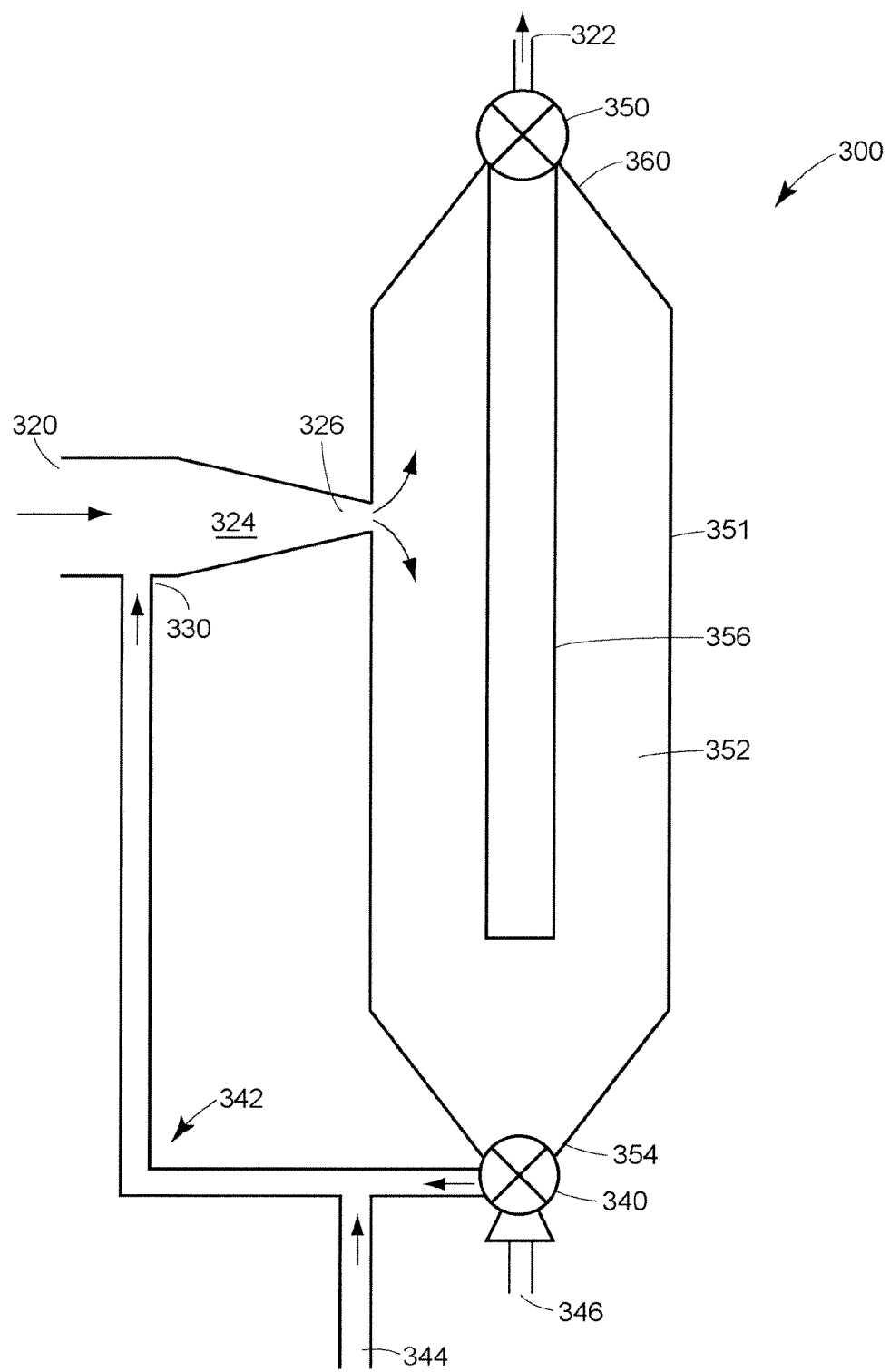
FIG. 4 is a schematic representation of a second low cost concentrator used to process wastewater.

Another method of generating carbon credits while disposing of landfill gas is evaporating waste water (such as landfill leachate) with relatively compact, inexpensive gas liquid contacting devices that run on renewable fuels, such as landfill gas. Two such low cost concentrators are shown in FIGS. 3 and 4. Each concentrator includes a gas inlet 220, 320, a gas exit 222, 322 and a flow corridor 224, 324 connecting the gas inlet 220, 320 and a gas exit 222, 322. The flow corridor 224, 324 includes a narrowed portion 226, 326 that accelerates the gas through the flow corridor 224, 324. A liquid inlet 230, 330 injects liquid into the gas stream at a point prior to the narrowed portion 226, 326. The gas liquid combination is thoroughly mixed within the flow corridor 224, 324 and a portion of the liquid is evaporated at the adiabatic system temperature. A demister 234 (or cyclonic mixing chamber 352) downstream of the narrowed portion 226, 326 removes entrained liquid droplets from the gas stream and re-circulates the removed liquid to the liquid inlet 230, 330 through a re-circulating circuit 242, 342 driven by pumps 240, 340. Fresh liquid is introduced into the re-circulating circuit 242, 342 via an inlet 244, 344 at a rate sufficient to offset the amount of liquid evaporated in the flow corridor 224, 234. Additionally, concentrated fluid is output from the re-circulating circuit 242, 342, via outlets 246, 346. Induction fans 250, 350 pull gas and entrained liquid through the demister 234 and the cyclonic mixing chamber 352 to the gas exits 222, 322. In FIG. 4, the gas is provided to the exit 322 via a hollow cylinder 356. These low cost concentrators are generally compact and transportable because many of the components may be manufactured from lightweight, inexpensive materials such as, plastic or fiberglass. Thus, these concentrators may be moved from site to site as needs dictate.

Using landfill gas to produce power (generally electricity) is another method of reducing greenhouse gas emissions and thereby generating carbon credits while disposing of landfill gas, because the power generating equipment is not using fossil fuels as it normally would be. Such power generation equipment can be used in conjunction with the above mentioned submerged combustion gas evaporators (i.e., the combustion gas used in the SGE is taken directly from the power generating equipment) and low cost concentrators. In this manner, depending on the regulatory status of the landfill, the carbon credits generated may be additive: once for the destruction of the methane gas and again for the generation of power from a renewable energy source. Furthermore, the power generated may be sold on the open market for an additional profit.

Moreover, waste heat generated by such power generating equipment may be recovered and reused by a heat recovery system, thereby further reducing greenhouse gas emissions and creating additional carbon credits. Two example waste heat recovery systems are shown in U.S. patent application Ser. Nos. 11/114,822 and 11/114,493, both of which are hereby incorporated by reference. In this case, the recovered waste heat may be transported to a nearby industry for use (FIG. 5). Again, such a method generates carbon credits because the waste heat, generated by a renewable fuel, is used in place of a traditional fossil fuel heat source.

FIG. 5 depicts an example of a method of reducing greenhouse gases and generating carbon credits by 1) destroying more potent GHG: 2) converting conventional processes to renewable fuel sources; and 3) using waste heat in industrial operations in place of heat generated by burning fossil fuels. The value of the carbon credits generated by this example method may be used to at least partially offset the costs of installing and maintaining the greenhouse gas emission reducing equipment. A typical small, unregulated landfill 100 is fitted with a gas collection system 110 and a liquid collection system 120. Landfill gas collected by the gas collection system 110 is burned in a combustion process 130 that may be a flare or other combustion process such as an engine, thus reducing the greenhouse effects of the methane by converting the methane into $CO_2$ and $H_2O$ and further generating carbon credits in the process. Landfill leachate collected by the liquid collection system 120 is transported to a Submerged Gas Evaporator (SGE) or a low cost concentrator 140. The SGE or low cost concentrator 140 uses the exhaust gas from the combustion process 130 to process and evaporate the leachate delivered by the liquid collection system 120. Thus, the SGE or low cost concentrator 140 generates carbon credits by processing the leachate with a renewable energy source (landfill gas) instead of using a combusted fossil fuel. Further, if caustic is added to the leachate, $CO_2$ from the exhaust gas may be sequestered as sodium carbonate, thus further reducing greenhouse gas emissions and generating further carbon credits. Over time, the carbon credits generated by the combustion process 130 and the SGE or low cost concentrator 140 may meet or exceed the costs of installing such a system. Thus, the generation of the carbon credits may improve the environment by making the installation of greenhouse gas reducing systems and/or leachate treatment systems economically feasible.

Additionally, waste heat 150 from the combustion process 130 may be captured and used in an industrial process in a nearby industry 160. Using the waste heat instead of heat from burning a fossil fuel generates carbon credits as discussed above. Thus, the exemplary method shown in FIG. 5 generates carbon credits in at least four different ways. First, GHG (landfill gas, i.e., methane) is destroyed generating carbon credits. Second, landfill gas (a renewable energy source) is used to evaporate and treat the landfill leachate instead of burning fossil fuel to evaporate and treat the leachate. Third, $CO_2$ from exhaust gas may be sequestered by chemical conversion, thus reducing the amount of $CO_2$ released to the atmosphere. Fourth, waste heat from a combustion device is used in an industrial process that normally would use heat generated by burning a fossil fuel.

Thus, one general method of reducing greenhouse gas emissions at, for example, a landfill, wastewater treatment plant, coal mine or other site that produces greenhouse gases, including for example methane gas, includes installing and/or using gas collection technology at the site to collect the gas, and thereafter implementing gas processing technology to convert the collected gas to other forms having reduced greenhouse gas volume or potency, all at a level greater than that required by the relevant regulations effecting the site. The collected gas may be processed in a combustion process, such as in a flare or other burner to convert the gas to other materials that are less potent greenhouse gases, and/or may be used as a fuel source to power other processes which might otherwise use fossil fuels, which thereby further reduces the production of greenhouse gases. Still further, the waste heat from the burning of the collected gas may be used in other processes to further reduce the amount of fossil fuels used in those other processes, thereby further reducing the emission of greenhouse gases that would otherwise be created by the use of fossil fuels or other non-renewable fuels.

As an integral part of this process, an estimate of the amount of reduction of the greenhouse gas emissions that will be obtained as a result of the installation and/or use of the gas collection and processing technology may be determined, and this estimate may be used to apply for approval or other authorization from an appropriate carbon credit trading authority for the generation of carbon credits. After the carbon credit creation process is approved and implemented at the site, the amount of greenhouse gas reduction actually accomplished at the site may be determined based on, for example, measurements of the amount of gas collected at the site, the amount and type of gas processed or converted to other products, the amount of fossil fuels which were not used due to the use of the collected gas as a power or energy source instead, etc. These measurements, which may be based on gas volume measurements, gas potency or composition measurements, energy measurements, etc., may then be used to actually obtain issuance of the carbon credits via the credit trading authority based on the approved process. Thereafter, the obtained carbon credits may be sold or traded via that or any appropriate trading or exchange authority, and thereby used to finance the installation and running of the gas emission reduction technology or for any other purpose such as to offset other carbon or greenhouse gas generating processes.

According to another method of reducing greenhouse gas emissions, waste reduction technology, such as technology that reduces the amount of waste that needs to be placed into a landfill site, may be installed or used to reduce greenhouse gas emissions. This technology may, for example, convert the waste that would otherwise be placed into the landfill into a usable form, such as a fuel source. In one example, appropriate types of waste may be highly compacted and later burned as fuel. In another example, certain types of the waste, such as plastics, paper products, etc., may be collected and recycled in known recycling processes to reduce the waste placed into the landfill site. The amount of converted waste may then be used to determine a number of carbon credits based on a projection of the reduction of methane gas that would otherwise result from the decomposition of that waste in the landfill site over time.

Still further, if the waste is converted to a fuel source, the fuel source may be used in one or more processes instead of fossil fuels to reduce the amount of fossil fuels used to power these other processes, thereby creating the basis for additional carbon credits. Also, heat or other waste energy from the use of the waste-based fuel source may be used as energy in still other processes, thereby further reducing the amount of fossil fuels needed to implement those other processes and thus further reducing greenhouse gas emissions.

Again, as an integral part of this process, an estimate of the amount of reduction of the greenhouse gas emissions that are obtained as a result of the installation and/or use of the waste reduction technology (including the use of renewable fuel created as a by-product of this waste reduction technology) may be determined, and this estimate may be used to apply for approval or other authorization from an appropriate carbon credit trading authority for the generation of carbon credits. After the carbon credit creation process is approved and implemented at the site, the amount of greenhouse gas reduction actually accomplished at the site may be determined based on, for example, measurements of the amount of processed or converted waste, the amount and types of fuel created as a result of the waste conversion process, the amount of fossil fuels which were not used due to the use of the waste-based fuel as a power or energy source, etc. These measurements, which may be based on waste reduction volume measurements, waste-based fuel production measurements, waste-based fuel composition measurements, measurements of the energy created from the waste-based fuel, etc., may then be used to obtain carbon credits via the credit trading authority based on the approved process. Thereafter, the obtained carbon credits may be sold or traded via that or any appropriate trading or exchange authority, and thereby used to finance the installation and running of the waste reduction technology or for any other purpose such as to offset other carbon or greenhouse gas generating processes.

Additionally, this method of reducing greenhouse gas emissions provides an opportunity to tailor site specific GHG reducing technology to the particular characteristics of an existing landfill site (e.g., size, condition, existing operations, infrastructure, etc.) in order to maximize the reduction of GHG and thus maximize the production of carbon credits.

The invention claimed is:

1. A method of reducing greenhouse gas emissions at a landfill, comprising:
    placing waste in the landfill to allow decomposition of the waste;
    collecting a first greenhouse gas resulting from the decomposition of the waste;
    converting at least some of the first greenhouse gas into a second, less potent greenhouse gas;
    applying for a first set of greenhouse gas emission reduction credits for converting the at least some of the first greenhouse gas into the second, less potent greenhouse gas;
    converting at least some of the second, less potent greenhouse gas into a non-greenhouse gas chemical compound; and
    applying for a second set of greenhouse gas emission reduction credits for converting at least some of the second, less potent greenhouse gas into a non-greenhouse gas chemical compound,
    wherein the greenhouse gas emission reduction credits are tradable on a financial exchange.

2. The method of claim 1, wherein converting at least some of the first greenhouse gas into a second greenhouse gas includes using the first greenhouse gas as a fuel in a further process, and applying for further greenhouse gas emission reduction credits for using the first greenhouse gas as a fuel instead using a fossil fuel in the further process.

3. The method of claim 1, further including selling or trading the greenhouse gas emission reduction credits.

4. The method of claim 1, wherein collecting the first greenhouse gas includes collecting methane gas, and wherein converting the at least some of the first greenhouse gas into a second, less potent greenhouse gas includes converting the methane gas into carbon dioxide and water.

5. The method of claim 4, wherein converting at least some of the second, less potent greenhouse gas into a non-greenhouse gas chemical compound includes sequestering some of the carbon dioxide as a solid to prevent release of the sequestered carbon dioxide into the atmosphere.

6. The method of claim 5, wherein applying for the second set of greenhouse gas emission reduction credits is possible because of the sequestering the some of the carbon dioxide as a solid.

7. The method of claim 5, wherein sequestering some of the carbon dioxide as a solid includes reacting the carbon dioxide with an alkali to form a carbonate salt.

8. The method of claim 1, wherein applying for a first set of greenhouse gas emission reduction credits for converting at least some of the first greenhouse gas into the second, less potent greenhouse gas includes measuring the amount of the first greenhouse gas that is converted into the second, less potent greenhouse gas and applying for an amount of greenhouse gas emission reduction credits based on the amount of the first greenhouse gas that is converted into the second, less potent greenhouse gas.

9. The method of claim 1, wherein converting at least some of the first greenhouse gas into the second, less potent greenhouse gas includes using the first greenhouse gas as a fuel source in an additional process.

10. The method of claim 9, further including applying for further greenhouse gas emission reduction credits for reducing the use of fossil fuels in the additional process as a result of using the first greenhouse gas as the fuel source in the additional process.

11. The method of claim 9, wherein using the first greenhouse gas as the fuel source in the additional process includes using the first greenhouse gas as a fuel source in a wastewater concentrator.

12. The method of claim 9, wherein using the first greenhouse gas as the fuel source in the additional process includes using the first greenhouse gas as a combustion source in a submerged combustion gas evaporator.

13. The method of claim 9, wherein using the first greenhouse gas as the fuel source in the additional process includes using the first greenhouse gas as a fuel source in a power generator.

14. The method of claim 9, wherein using the first greenhouse gas as the fuel source in the additional process includes using the first greenhouse gas as a fuel source in a digester.

15. The method of claim 9, wherein using the first greenhouse gas as the fuel source in the additional process includes using the first greenhouse gas as a fuel source in a methanol recovery process.

16. The method of claim 1, wherein converting at least some of the first greenhouse gas into the second, less potent greenhouse gas includes producing heat as a byproduct of the conversion process, and further including using the heat as an energy source in an additional process.

17. The method of claim 16, further including applying for further greenhouse gas emission reduction credits for reducing the use of fossil fuels in the additional process as a result of the use of the heat as an energy source in the additional process.

18. The method of claim 1, further including converting a portion of the waste into a fuel prior to allowing the portion of the waste to undergo decomposition and applying for further greenhouse gas emission reduction credits for reducing the amount of greenhouse gas produced at the landfill based on the amount of waste converted into the fuel.

19. The method of claim 18, wherein converting the portion of the waste into a fuel includes shredding and compressing the portion of the waste to produce a refuse derived fuel.

20. A method of reducing greenhouse gas emissions in a landfill, comprising:
    collecting methane gas created in the landfill due to decomposition of waste at the landfill;

collecting leachate from the landfill due to the decomposition of waste at the landfill;

burning the collected methane gas to convert the methane gas into carbon dioxide and water;

applying for a first set of greenhouse gas emission reduction credits for converting the methane gas into carbon dioxide and water, which are less potent greenhouse gases;

using the exhaust gas from the combustion process to process the leachate; and applying for a second set of greenhouse gas emission reduction credits for reducing the amount of fossil fuel used to process the leachate, wherein the greenhouse gas emission reduction credits are tradable on a financial exchange.

21. The method of claim 20, wherein the step of burning the collected methane gas includes burning the collected methane gas in a submerged combustion gas evaporator and the step of using the exhaust gas from the combustion process to process the leachate includes processing the leachate in the submerged combustion gas evaporator.

22. The method of claim 20, wherein the step of burning the collected methane gas includes burning the collected methane gas in a wastewater concentrator, and the step of using the exhaust gas from the combustion process to process the leachate includes processing the leachate in the wastewater concentrator.

23. The method of claim 20, further including sequestering at least some of the carbon dioxide as a solid to prevent release of the sequestered carbon dioxide into the atmosphere.

24. The method of claim 23, further including applying for additional greenhouse gas emission reduction credits for sequestering the carbon dioxide as a solid.

25. The method of claim 20, further including using waste heat generated from the burning of the collected methane as an energy source in an industrial process.

26. The method of claim 25, further including applying for additional greenhouse gas emission reduction credits for using the waste heat as the energy source in the industrial process or processes instead of using a fossil fuel as the energy source in the industrial process.

27. The method of claim 20, further including converting a portion of the waste at the landfill into a fuel prior to allowing the portion of the waste to undergo decomposition and applying for further greenhouse gas emission reduction credits for reducing the amount of greenhouse gas produced at the land based on the amount of waste converted into the fuel.

28. The method of claim 27, wherein converting the portion of the waste into a fuel includes shredding and compressing the portion of the waste to produce a refuse derived fuel.

* * * * *